June 22, 1948. R. BIRMANN 2,443,717
EXHAUST GAS AND HOT AIR TURBINE SYSTEM
Filed May 2, 1942 4 Sheets-Sheet 1

INVENTOR
Rudolph Birmann
BY
ATTORNEYS.

June 22, 1948.  R. BIRMANN  2,443,717
EXHAUST GAS AND HOT AIR TURBINE SYSTEM
Filed May 2, 1942  4 Sheets-Sheet 4

INVENTOR.
Rudolph Birmann

WITNESS:
BY
ATTORNEYS

Patented June 22, 1948

2,443,717

UNITED STATES PATENT OFFICE 2,443,717

EXHAUST GAS AND HOT AIR TURBINE SYSTEM

Rudolph Birmann, Newtown, Pa., assignor, by mesne assignments, to Turbo Engineering Corporation, a corporation of Delaware Application May 2, 1942, Serial No. 441,537

8 Claims. (Cl. 60—13)

This invention relates to a turbine system combined with an internal combustion engine and designed to furnish power for supercharging, propulsion and/or the driving of devices such as airplane or ship auxiliaries by the utilization of exhaust gases from an engine, or other source, such as a burner, of products of combustion available for turbine drive.

The heat energy contained in the exhaust gases of a modern internal combustion engine represents as much as 40% of the heat energy in the fuel that is consumed by the engine. This is substantially more than the equivalent of the useful power output of the engine. Suggestions have accordingly been made that this waste energy be utilized for driving, by means of an exhaust turbine, a generator, or other device, designed, for example, to furnish the auxiliary demands of a ship or airplane and particularly its electrical energy requirements.

While the solution of this problem would appear relatively simple, there are quite a number of difficulties involved. The exhaust gases are at an extremely high temperature and the turbine must be capable of withstanding such temperatures at very high speeds. In order to provide a small and light turbine design capable of efficiently handling the large volume of gases available from the engine, it must operate at a very high speed of the order, for example, of 24,000 R. P. M. In order that the back pressure on the engine should not be substantially increased, the turbine efficiency must be quite high. Particularly in the case of the generation of electrical energy, the regulation of the turbine system must be very good, of the order, for example, of ±2%. During idling periods of the engine that is supplying the exhaust gases, as for example, when a plane is on the ground or in a glide, the available energy in the exhaust gases may be insufficient to drive the turbine. During such periods, and of course also when the engine is shut down completely, the turbine system should continue to furnish uninterrupted power. Similarly, the cooling of the turbine must not be dependent on the condition of the engine, and cooling must occur when the craft is stationary as well as when it is in motion or flight.

The broad object of the present invention is the provision of a turbine system for the purpose outlined, which will solve the various problems above set forth. The solution of some of these problems is not part of the present invention, but is taken care of by the adoption of an improved type of turbine to which reference will be made hereafter and which is the subject of Patent 2,283,176. The present application is particularly directed to the provision of means for providing close regulation of a turbine system of this type and to the continuous operation of such turbine system independently of the operating conditions of the engine. A further object of the invention is to utilize similar principles for effecting propulsion, aiding an internal combustion engine at certain times or at others providing a quite separate power plant to produce propulsion by either propeller action or by providing a propulsion jet.

These and other objects of the invention will become apparent from the following description, read in conjunction with the accompanying drawings, in which:

Figure 5 is a detailed sectional view on the line 5—5 of Figure 1.

The principles of the invention and a practical embodiment thereof will best be understood by first considering the details of Figure 2, and then later the association of the matter of Figure 2 in the complete system. For simplicity of description, and in view of the fact that it presents the major problem, an application of the invention to aircraft uses will be primarily considered, though it will be evident that the invention is more broadly applicable to other uses, even to stationary installations.

Figure 2:
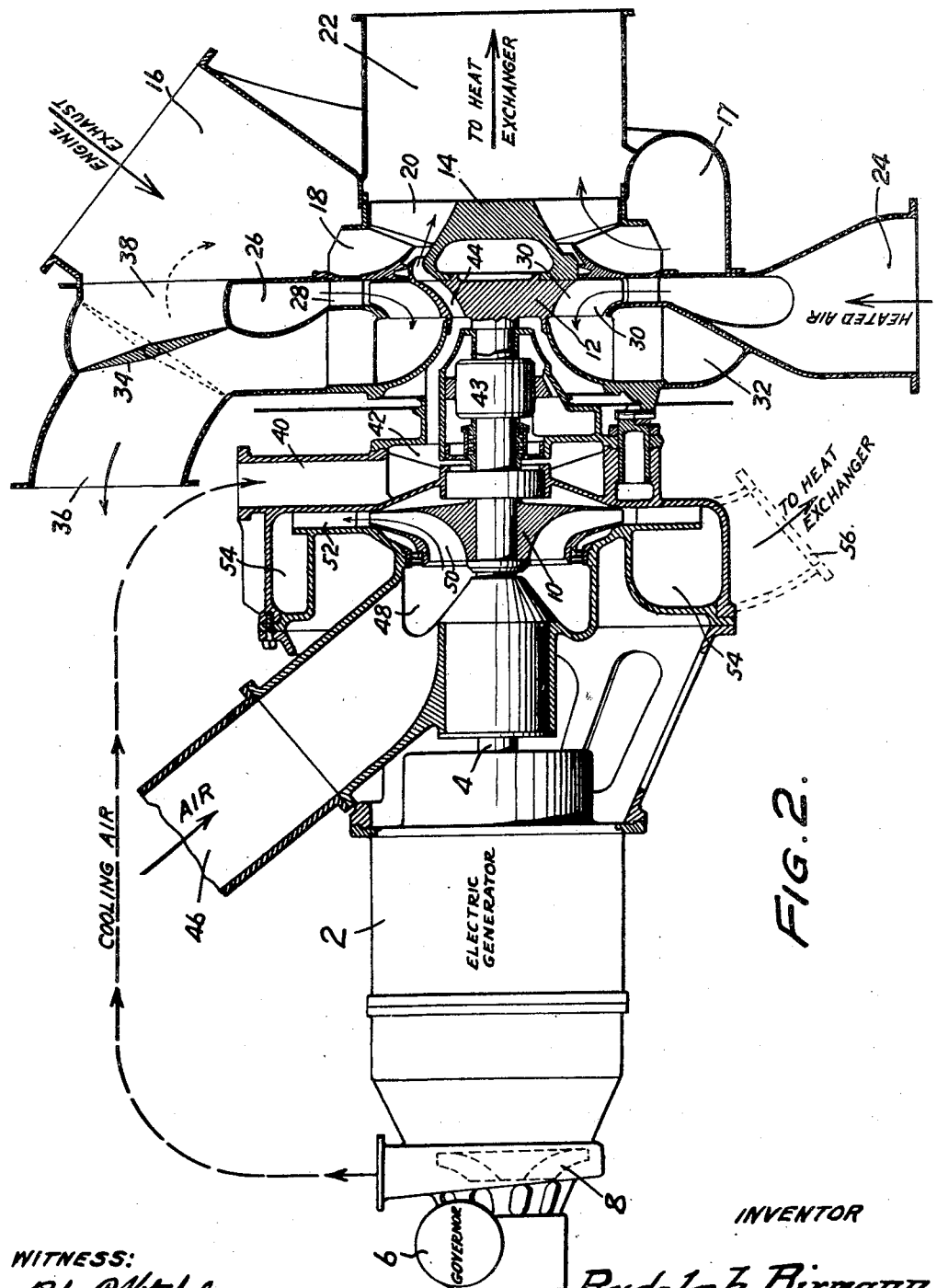
Figure 2 is a sectional view showing details of the various rotating parts of the system of Figure 1 and the stationary elements directly associated with them.

Referring first to Figure 2, there is illustrated therein at 2 an electrical generator as a typical auxiliary of an airplane which it might be desired to drive by means of a turbine system. It will be understood, of course, that the system might be used to drive, in addition to a generator such as 2, other auxiliaries. It is frequently desirable to drive such other equipment by means of electric motors powered by a generator such as illustrated at 2. The generator shaft is indicated at 4, and on it are mounted the various rotating elements of the system. The shaft 4 drives, for example, a governor indicated at 6, the use of which for regulation purposes will be apparent hereafter. The shaft may also carry a blower or compressor indicated at 8 which may provide compressed cooling air for the turbine.

Also mounted on the motor shaft 4 (or on a shaft geared or coupled thereto) are the impeller 10 of a centrifugal compressor, the wheel 12 of a hot air turbine, and the wheel 14 of an exhaust gas turbine. The latter receives exhaust gases from the engine through the passage 16 communicating with an annular gas chest 17 from which the gases pass through suitable nozzles, indicated at 18, into the buckets 20 provided in the rotor 14. The exhaust gases from this turbine then pass through the exhaust passage 22 to a heat exchanger which will be referred to later.

The heated air for the driving of the hot air turbine 12 enters at 24 into the annular chest 26 from which it passes through nozzles 28 into the buckets 30 of this turbine, whence it is exhausted into the exhaust chamber 32, the flow from which is controlled by means of a valve 34 which may alternatively occupy either the full line or the dotted line position illustrated in the drawing. With the valve 34 in the full line position, the exhausted air may pass to the atmosphere through the passage 36. With the valve in the dotted line position, it returns through passage 38 to the exhaust gas chest 17 from which it flows through the exhaust gas turbine acting as a second stage, as hereafter described.

To effect cooling of both the hot air and exhaust gas turbines compressed air from the compressor 8 may pass through the passage 40 and thence into the space 42 surrounding the turbine bearing 43 from which it may flow through cooling passages 44 in the wheel 12 to be directed therefrom through buckets 20 of the wheel 14.

Air for the operation of the turbines enters at 46, for example, from a suitable opening at the forward end of the airplane designed to pick up air during flight. This air passes to the inlet chamber 48 of the impeller 10 and is caused to flow through the impeller passages 50 into the diffuser passages 52 and thence into the discharge volute 54, from which it passes at 56 to the heat exchanger.

Figure 1:
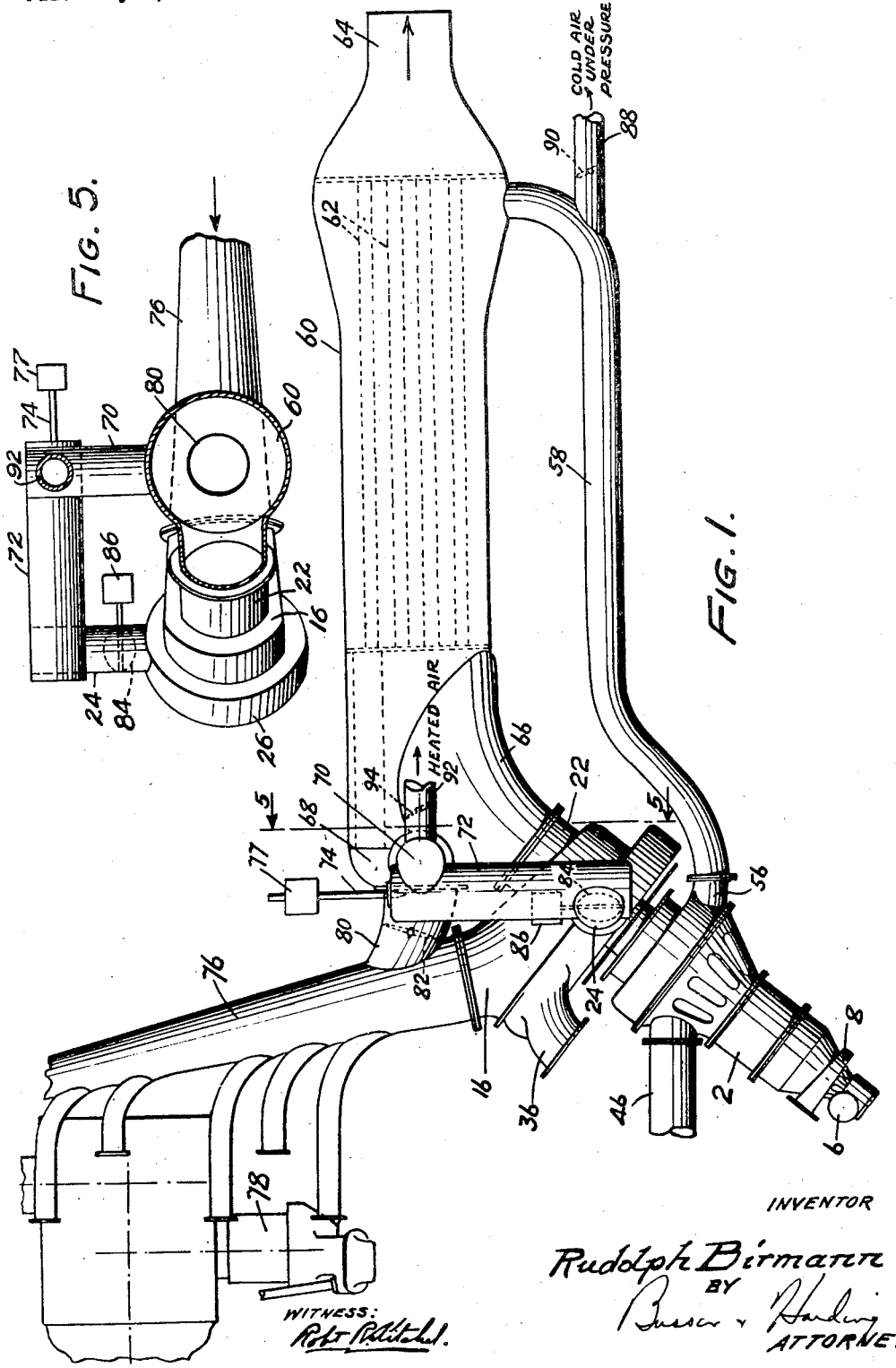
Figure 1 is a diagrammatic plan view illustrating the general layout of a turbine system provided in accordance with the invention and applied to the driving of auxiliaries.

Before passing to the operation of the system and consideration of Figure 1, reference may be made to the design of the turbines. Both of these turbines are preferably constructed in accordance with the disclosures of my Patents 1,926,225 and 1,959,703, by which construction they may be made quite small and light and at the same time capable of extremely high speed operation at elevated temperatures, as is necessary for efficient operation under the conditions involved in a system of this type. Additionally, there are involved the advantageous features of construction and operation described in detail in my Patent No. 2,283,176, dated May 19, 1942. As disclosed in said application, by the proper arrangement of entrance lips due account may be taken of differences in spouting velocities from nozzles and peripheral speed of buckets consistent with operation at high efficiencies. It will be noted that in line with this the entrance lips of the buckets of the wheels 12 and 14 are quite different to secure proper operation, though these turbines are rotating at the same speed, when they receive gases under quite different velocity conditions. Additionally, said patent describes the considerations to be taken into account in the cooling of turbines as effected, for example, by means of the passages 44. As pointed out therein, the energy imparted to such cooling gases may be recovered if, to effect the cooling, the gases are subjected first to compression and then, either after the compression takes place or during the compression, they have heat imparted to them after which they are discharged in such fashion as to exert in an efficient fashion a forward thrust on the turbine which they are cooling. This principle is embodied by providing the passages 44 of such nature as to effect first compression followed by the discharge of the gases as indicated by the arrow in Figure 2 through the bucket passages of the turbine 14 where they will not only effect further cooling, but will be discharged with the exhaust from the turbine in such fashion as to aid in driving it.

It may also be remarked that the impeller 10 has its passages preferably designed in accordance with the disclosure of my prior patents referred to above.

Referring now to Figure 1, the devices in Figure 2 may be readily identified therein by considering the corresponding characters applied to the various outlet passages. In that figure it will be noted that the outlet 56 from the compressor volute housing communicates through a pipe 58 with the shell of a heat exchanger indicated at 60 through which extend exhaust gas tubes 62 discharging their exhaust through the end 64 of the exchanger in the form of a jet which may exert a substantial propulsion effect particularly in aircraft uses. The exhaust gases entering these tubes 62 enter them from a connection 66 to the outlet passage 22, which receives the gases discharged from the turbine wheel 14. The shell of the exchanger 60 receiving the air from the pipe 58 communicates through a suitable conduit with the chamber 68 which, in turn, communicates with the upstanding pipe 70 communicating with the horizontal chamber 72, which in turn communicates with the inlet passage 24 to the hot air chest 26. A fuel burner nozzle 74 is directed lengthwise of the chamber 72, as indicated, the fuel control for this nozzle being indicated at 77.

Exhaust gases from the airplane engine 78 are directed through the exhaust manifold 76 to the connection 16, which opens into the exhaust gas chest 17. A branch connection from the exhaust manifold 76 is indicated at 80, and may permit direct flow of the exhaust gases from the engine through the heat exchanger tubes 62. A valve 82 located in the passage 80 is arranged to control the degree of bypassing which may be involved for proper operation. Control of the passage 24 for heated air from the heat exchanger to the hot air turbine 12 is effected by means of a valve 84, the controlling means for which is diagrammatically illustrated at 86.

At high altitudes it may be necessary to provide compressed air for supercharging the cabin of the plane. Cold air may be introduced under pressure through the branch connection 88 from the pipe 58 under the control of valve 90, while heated air may be introduced through the passage 92, communicating with the pipe 70, which passage is controlled by the valve 94. By the use of these two connections with suitable adjustment of the valves, the cabin supercharging air may be regulated in both temperature and quantity.

In the operation of the system so far described, let it be assumed first that operation is taking place with the airplane in flight. Under such conditions, the exhaust gases from the engine may be more than sufficient for effecting operation of the turbine system.

Under such flight conditions, the valve 34 will be in the full line position indicated in Figure 2 and fuel will not be burned in the chamber 72, the passage to the nozzle 74 being closed off by the control 77, which is subject to the action of the governor 6.

Under these conditions, the exhaust gases from the engine drive the turbine wheel 14 and are exhausted therefrom through the tubes 62 of the heat exchanger to the atmosphere. At this time, it is quite unnecessary to call upon the turbine wheel 12 to contribute useful power for driving the generator 2. However, the impeller 10 is necessarily being operated at this time to compress air entering at 46 to cause it to flow through pipe 58 to the heat exchanger. The energy so put into the air will not be wasted because the air heated by its passage through the heat exchanger is delivered to the hot air turbine 12 to drive the same, being then exhausted to the atmosphere through the passage 36.

If it were not for the heating in the heat exchanger, it would be obvious that the compression of air by the compressor 10 even though the air was later passed through the turbine 12, would represent a substantial loss of energy. However, by introducing heat into the compressed air, in the heat exchanger 60, the waste heat of the exhaust gases would impart enough energy to this compressed air to cause it to impart to the shaft 4 through the medium of the turbine 12 energy in excess of the energy delivered to the compressor 10. Thus it is that in effect under flight conditions the operation is substantially that which would result if the turbine 14 were used and the compressor 10 and turbine 12 were completely absent. As a matter of fact, the heat imparted to the compressed air will, in general, enable the turbine 12 to contribute more energy to the shaft 4 than is necessary to overcome losses, for example, in both effecting the compression of the air by the compressor 10 and that involved in providing cooling air by means of the blower 8.

The operation of the system comprising the compressor 10, the heat exchanger and the turbine 12 is not, however, confined merely to the avoidance of losses due to idling operation, but takes part in effecting close regulation of the operation of the system as a whole. For an electrical generator to operate properly, it should be run at substantially constant speed. While a bypass valve such as indicated at 82 may be provided under the control of the governor 6, for bypassing variable quantities of the exhaust gases to cause the feed of the exhaust gases to the turbine 14 to correspond to the load on the generator 2, or any other auxiliaries driven by the shaft 4, the action of a valve such as 82 is necessarily quite sluggish due to the quite large quantities of gases contained in the exhaust manifold and the necessity for changing the speed of flow through the heat exchanger and the inlet passages to the turbines 14. Accordingly, the governor 6 is not only connected to the valve 82 to control its position in accordance with the load, but it is additionally connected to the control 86 for the valve 84 in the hot air passage. The relatively smaller quantity of hot air which is flowing in the system can be much more readily controlled than the exhaust gases and the valve 84 under the action of the governor 6 in controlling the entry of hot air to the turbine 12 substantially effects immediate response of the system to changes in electrical load, more hot air being passed to the turbine 12 as the load increases and less as the load decreases. By this throttling action of the valve 84, the effective load on the turbine 14 may be so rapidly changed as to maintain within very close limits a constant speed of the generator 2.

Assume now an idling condition of the airplane engine under which it does not provide a sufficient quantity of exhaust energy for the driving of the system. Under such conditions, fuel will flow through the burner 74 under the control 77 which is controlled by the governor 6 whenever the load as compared with the variable energy in the exhaust gases is so great that adjustment of the valves 82 and 24 alone will not be sufficient to maintain the generator operating at its proper speed. When burning of fuel within the chamber 72 occurs, the amount of heat energy added to the heated air coming from the heat exchangers is very much increased and consequently the turbine 12 now imparts a very substantial or even major amount of energy to drive the shaft 4, the turbine 14 continuing to receive such engine exhaust gases as may be available. In addition, however, when the amount of fuel being burned in the chamber 72 rises above a certain amount, the valve 34 will be automatically thrown, under the action of the governor 6, into the dotted line position so that the exhaust gases from the turbine 12, which now contain a very considerable residual heat energy, will be passed into the gas chest 17 to flow through the buckets of the turbine 14 and thence to the heat exchanger where the residual heat of these gases, as well as that of the gases coming from the engine, becomes available to preheat the hot air passing to the chamber 72. It may be here noted that it is undesirable during the operation previously described when the airplane is in flight to have the exhaust gases from the turbine 12 pass to the heat exchanger, because they contain rather little heat energy and would tend to lower the temperature of the heat exchanger rather than raise it. However, whenever a substantial amount of fuel is being burned in the chamber 72, the gases exhausted from the turbine 12 will contain such an amount of residual heat energy as to warrant passing them through the turbine 14 and the heat exchanger.

It will be apparent that, having been started by exhaust gases from the engine, the turbine system will continue to operate even if the engine is stopped. Under such conditions, the fuel being burned in the chamber 72 is automatically increased in such amount, under the action of the control 77 which is subject to the governor 6, as to provide sufficient heat energy to drive the shaft 4 at its normal speed, using the turbine 12 as a first stage and the turbine 14 as a second stage. Thus, under these conditions the system independently of the engine becomes a self-contained combustion turbine unit. The simplest method of starting it at any time on the ground is, of course, to run the airplane engine for just sufficient time to bring the turbine unit up to a speed from which it will pick up to normal speed under its own operation. After such starting is effected, the airplane engine may be stopped and the system will continue to operate.

Intermediate operations between those just described will take place under the automatic control of the governor 6 in an obvious fashion, which need not be described in detail. By connecting the governor 6 to control the valve 82, the valve 84, bypass valve 34 and the introduction of fuel through the burner 74, it will be obvious that a constant speed operation of the shaft 4 may be readily effected. Except when the engine is idling or is stationary, the burner 74 will not in general be operated, though it will be understood that very heavy loads on the generator 2 may sometimes occur during flight, and under such circumstances the burner may come into operation. Under high altitude flight conditions, the high amount of energy available in exhaust gases may be so great that a very substantial portion of them may be bypassed by the valve 82 directly into the heat exchanger and thence into the atmosphere, even though normal loads may be imposed on the generator 2. If the system described is used in conjunction with a turbine driven supercharger, the exhaust gases from the engine may pass to the supercharger in increasing quantities at high altitudes without detracting from the energy imparted to the generator system.

Figure 3:
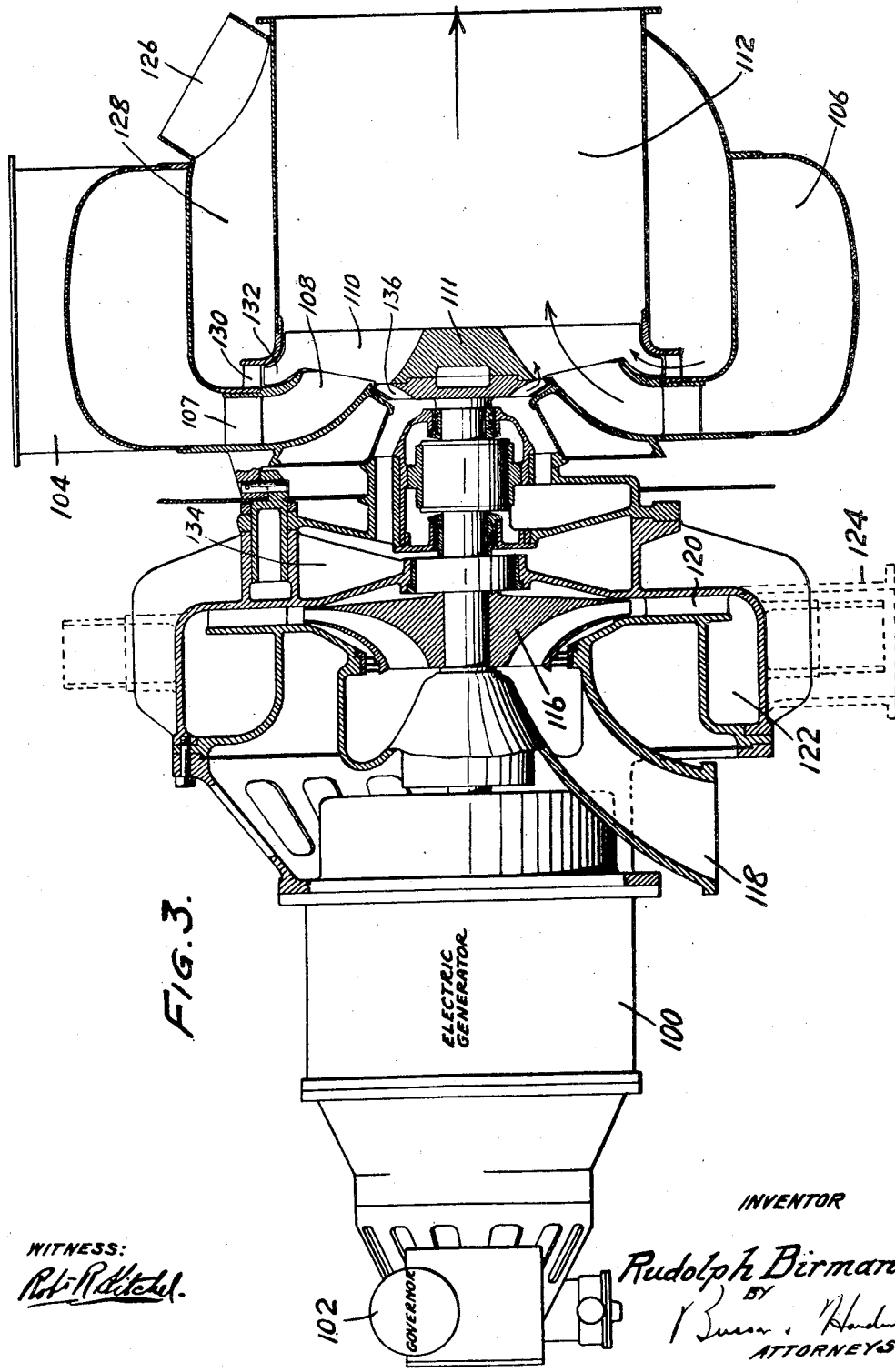
Figure 3 is a view similar to Figure 2, but showing a modification.

While the embodiment just described is a preferred one, there may be provided a substantially simpler and lighter arrangement at some sacrifice of efficiency, as indicated by the modification of Figure 3. In this modification a generator corresponding to generator 2 is indicated at 100 with which there is associated the governor indicated at 102 with such cooling arrangements as may be necessary, but which are not illustrated.

In this modification exhaust gases from the engine enter at 104 the exhaust gas chest 106, from which, through suitable nozzles indicated at 107 and the vortex space 108, the exhaust gases are directed into the buckets 110 of the turbine wheel 111, which is carried by the generator shaft. From the turbine the gases pass through the connection 112 to a heat exchanger which may be of the type previously described and hence need not be redisclosed.

As in the previous modification, the generator shaft carries an impeller 116 of a centrifugal compressor which receives atmospheric air at 118 and compresses it, passing it through the diffuser passages 120 to the discharge volute 122, from which it passes from 124 through the heat exchanger and a burner chamber of the type previously described to the entrance 126 of the hot air chest 128. From the chest 128 it passes through nozzles 130 into the extension portions 132 of the buckets 110 of the turbine 111, from which it is discharged along with the major exhaust gases through 112 to the heat exchanger. In this modification, as in the preceding one, cooling gas may be introduced either from the compressor 116 or an auxiliary blower or compressor to the space 134 surrounding the bearings, whence it passes through cooling passages 136 of the same general type as those described in the previous modification and involving the operations described in my Patent 2,283,176.

In the operation of this modification, the action is substantially similar to that of the previous modification. It has the advantage of reduced weight, but it will be obvious that the utilization of the same turbine passages for both the engine exhaust gases and the heated air results in necessary departure from the best design to such extent that the maximum load which may be carried under ground operating conditions may be substantially reduced, or, alternatively, that the efficiency may be lowered and quite large quantities of fuel burned in the burner chamber to secure operation. Additionally, the mingling of the discharge from the hot air passages of the turbine with the discharge of the exhaust gases lowers the temperature in the heat exchanger to a considerable extent, also resulting in less efficient operation. Consequently this modification is primarily desirable only when the advantages of reduced weight and simplicity are greater than the advantages of high efficiency. Automatic control of the operation may take place in the same fashion as that involved in connection with the first modification and need not be again described.

While reference has been made to the use of a separate supercharger, it will be evident that supercharging of an engine may be accomplished by the compressor 10 or 116 if it and its driving turbines are of sufficient capacity and providing the auxiliary (such as a generator) is not necessarily closely regulated as to speed. Thus supercharging may be either a major or minor function of the unit. Furthermore, while the unit has been described as applied to an internal combustion engine of reciprocating type, it will be evident that it may be associated with a burner and turbine combination, the latter operating on products of combustion.

Figure 4:
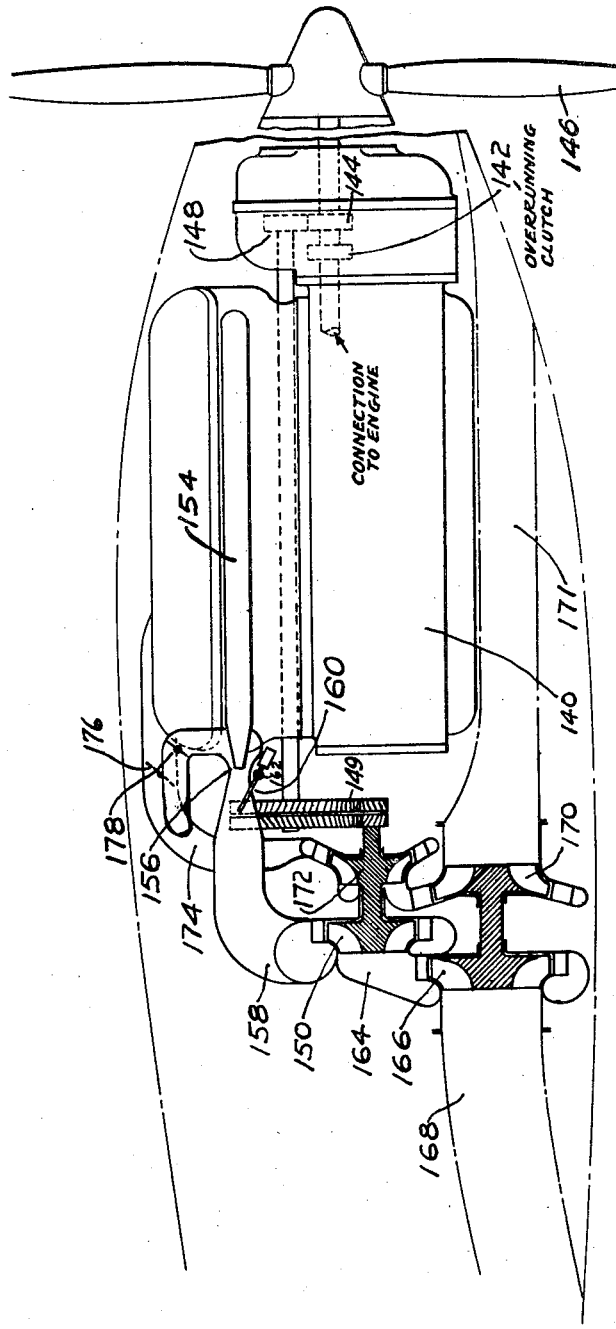
Figure 4 is a diagrammatic view illustrating the application of the invention to the supercharging of an internal combustion engine and the additional aiding of the engine or substitution of a turbine drive for propulsion purposes.

In the foregoing description, there has been primarily stressed the driving of auxiliaries, such as a generator or the like, by means of the exhaust gases from an engine with alternative provision for providing combustion gases for effecting drive while the engine is either idle or operating at low power output. The principles of the invention, however, may be applied to the generation of propulsive power through the use of a gas turbine associated with an internal combustion engine either by causing it to aid in the driving of a propeller or to provide a jet of gas for jet propulsion purposes. Referring now to the modification of Figure 4, there is indicated therein an internal combustion engine 140 arranged to drive a propeller 146 through an overrunning clutch 142, to which the engine 140 is connected, there being interposed between the overrunning clutch and the propeller a gear 144 meshing with a pinion 148 connected through reduction gearing 149 to a high pressure turbine 150. The gases from the exhaust manifold 154 of the engine 140 pass into the central tube of an ejector 156 and thence into a combustion chamber 158 in which is located a fuel burner 160, the flow of fuel to which is controlled by a valve 162. The exhaust gases from the high pressure turbine 150 pass through connection 164 to drive a low pressure turbine 166 from which the exhaust gases flow through the tail passage 168, desirably so arranged as to provide a propulsion jet capable of exerting a propulsive thrust on the airplane.

The low pressure turbine 166 drives the low pressure stage of a two-stage compressor comprising an impeller 170. The high pressure stage, comprising the impeller 172, is driven by the high pressure turbine 150. The air is desirably led through a passage 171 to the first stage impeller from openings in the wing edges or in the nacelle exposed to the slip stream of the propeller so as to provide, in effect, a preliminary compression stage. The air from the compressor is delivered into the passage 174, which is provided with one branch controlled by a valve 176 to supply supercharging air to the engine 140 and another branch 178 communicating with the ejector 156 and serving to exert an ejector effect on the gases in the exhaust manifold and thereby reduce back pressure on the engine.

In the operation of this arrangement, under take-off conditions, a considerable amount of unburned fuel may pass into the engine exhaust and will be burned within the combustion chamber 158 by air passing valve 178. The hot products of combustion will drive the turbine 150, which will aid in driving the propeller 146 through the connection of the gears 148 and 144. Under such take-off conditions, the engine 140 will be running at full speed and will pick up the clutch at 142 to drive the propeller. The exhaust gases from the turbine 150 serve to drive the low pressure turbine 166 and hence the low pressure stage of the compressor to provide the necessary air to the high pressure stage and thence through the connection 174 to the engine and turbines. An excess amount of air will be provided at this time, but will not be wasted, contributing to a propulsion jet emerging from the tail passage 168.

At high altitudes, the valve 176 may be opened to effect supercharging of the engine, and 178 may, at this time, be partially or fully closed. The power unit, however, is adapted to effect the distribution of the load between the engine and high pressure turbine 150 and, in fact, in an extreme case, the engine 140 may be cut out altogether, the valve 178 being then opened and fuel introduced at 160 to provide the necessary combustion gases for driving the turbines. By reason of the provision of the overrunning clutch at 142, the engine under such conditions will not form any part of the load imposed on the turbine 150, this clutch preventing the engine from picking up the drive until its speed exceeds that of the propeller shaft.

As a result of the above, there may be provided either what is essentially an engine drive, what is essentially a turbine drive, or any desired intermediate combination of the two. By utilizing two turbines in a series as illustrated, the exhaust gases may be very efficiently used, and large masses of air may be provided in conjunction with the combustion gases to provide a propulsion jet exerting a quite considerable mass effect. This arrangement has been only diagrammatically illustrated, since its details, including those of construction and operation, may involve the matters more fully disclosed in my applications Serial Nos. 439,569 and 439,570, filed April 18, 1942, the latter now being Patent No. 2,428,830.

It will be evident that other embodiments of the invention may be provided without departing from its principles.

What I claim and desire to protect by Letters Patent is:

1. In combination, an internal combustion engine, a shaft, a pair of turbines for driving said shaft, means for directing exhaust gases from the engine to drive one of said turbines, an air compressor driven by said shaft, means providing heat exchange between gases exhausted from said turbine and air from said compressor, auxiliary means for adding heat to air from said compressor, means for directing the compressed heated air to drive the second turbine, and means for directing the air exhausted from the second turbine to drive the first turbine.

2. In combination, an internal combustion engine, a shaft, a pair of turbines for driving the shaft, a connection between the engines and one of the turbines for conducting exhaust gases from the engine to drive said turbine, a heat exchanger connected to the exhaust from the said turbine, an air compressor driven by said shaft, means for delivering air from the compressor to the heat exchanger, a combustion chamber, means for delivering fuel to the combustion chamber, means for delivering compressed heated air from the heat exchanger to the combustion chamber, means for delivering gas from the combustion chamber to drive the second turbine, an outlet to the atmosphere from the second turbine, a second connection from the second turbine to the first turbine, and means for controlling the flow from the second turbine either to the atmosphere or to the first turbine through the respective outlet and connection.

3. In combination, an internal combustion engine, a shaft, a pair of turbines each having a hub for driving the shaft, a connection between the engine and one of the turbines for conducting exhaust gases from the engine to drive said turbine, a heat exchanger connected to the exhaust from the said turbine, an air compressor driven by said shaft, means for delivering air from the compressor to the heat exchanger, a combustion chamber, means for delivering fuel to the combustion chamber, means for delivering compressed heated air from the heat exchanger to the combustion chamber, means for delivering gas from the combustion chamber to drive the second turbine, a second air compressor driven by said shaft, an air passage surrounding the shaft, air passages in the hubs of the turbines communicating with said air passage and arranged to deliver air to drive the first turbine, and means for delivering air from the second compressor to the air passage surrounding the shaft.

4. In combination, an internal combustion engine, a shaft, a pair of turbines for driving said shaft, means for directing exhaust gases from the engine to drive one of said turbines, an air compressor driven by said shaft, means providing heat exchange between gases exhausted from said turbine and air from said compressor, means for directing compressed heated air to drive the second turbine, and means for directing air exhausted from the second turbine to drive the first turbine.

5. In combination, an internal combustion engine, a shaft, a pair of turbines for driving said shaft, means for directing exhaust gases from the engine to drive one of said turbines, an air compressor driven by said shaft, means for adding heat to air from said compressor, means for directing compressed heated air to drive the second turbine, and means for directing air exhausted from the second turbine to drive the first turbine.

6. In combination, an internal combustion engine, a shaft, a pair of turbines for driving said shaft, means for directing exhaust gases from the engine to drive one of said turbines, an air compressor driven by said shaft, means providing heat exchange between gases exhausted from said turbine and air from said compressor, means for directing compressed heated air to drive the second turbine, and means for directing air exhausted from the second turbine alternatively either to drive the first turbine or to the atmosphere.

7. In combination, an internal combustion engine, a shaft, a pair of turbines for driving said shaft, means for directing exhaust gases from the engine to drive one of said turbines, an air compressor driven by said shaft, means for adding heat to air from said compressor, means for directing compressed heated air to drive the second turbine, and means for directing air exhausted from the second turbine alternatively either to drive the first turbine or to the atmosphere.

8. In combination, an internal combustion engine, a shaft, a pair of turbines for driving said shaft, means for directing exhaust gases from the engine to drive one of said turbines, an air compressor driven by said shaft, means providing heat exchange between gases exhausted from said turbine and air from said compressor, auxiliary means for adding heat to air from said compressor, means for directing the compressed heated air to drive the second turbine, and means for directing the air exhausted from the second turbine alternatively either to drive the first turbine or to the atmosphere.

RUDOLPH BIRMANN.

REFERENCES CITED

The following references are of record in the file of this patent:

UNITED STATES PATENTS

| Number | Name | Date |
| --- | --- | --- |
| 1,601,402 | Lorenzen | Sept. 28, 1926 |
| 1,708,402 | Schilling | Apr. 9, 1929 |
| 1,757,045 | Holzwarth | May 6, 1930 |
| 2,063,477 | Young et al. | Dec. 8, 1936 |
| 2,162,956 | Lysholm | June 20, 1939 |
| 2,173,595 | Schütte | Sept. 19, 1939 |
| 2,216,731 | Birmann | Oct. 8, 1940 |

FOREIGN PATENTS

| Number | Country | Date |
| --- | --- | --- |
| 696,369 | France | Oct. 14, 1930 |
| 211,352 | Switzerland | Dec. 2, 1940 |
| 215,484 | Switzerland | Oct. 1, 1941 |